Figure 1:
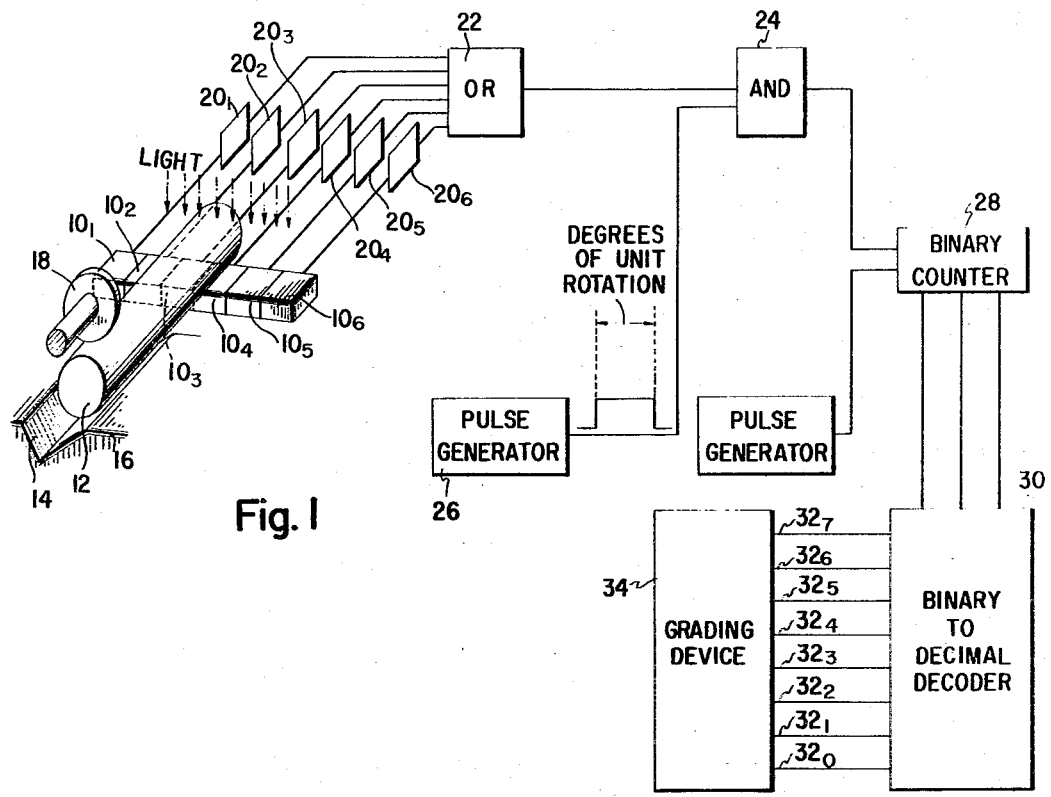

March 7, 1967  WOLF-DIETER FUHRMANN ET AL  3,308,302
APPARATUS FOR DETERMINING SHAFT CURVATURE INCLUDING
ROTATING SHAFT AND PLURAL PHOTOCELLS
Filed Sept. 14, 1965   3 Sheets-Sheet 1

WITNESS:
Heidi Schlechauf

INVENTORS
Wolf-Dieter Fuhrmann
BY and Josef Zocher

Marshall J. Breen
ATTORNEY

United States Patent Office 3,308,302
Patented Mar. 7, 1967

3,308,302
APPARATUS FOR DETERMINING SHAFT CURVATURE INCLUDING ROTATING SHAFT AND PLURAL PHOTOCELLS
Wolf-Dieter Fuhrmann, Kohlscheid, and Josef Zocher, Birkesdorf, Germany, assignors to The Singer Company, New York, N.Y., a corporation of New Jersey
Filed Sept. 14, 1965, Ser. No. 487,217
16 Claims. (Cl. 250—219)

This invention relates in general to measuring equipment, and in particular provides apparatus for determining the straightness (or curvature) of an elongated shaft or the like. In providing the invention, use is made of the fact that the figure of revolution produced by rotating a curved or bent shaft generally about its axis is dimensionally reflective of the degree of curvature or bend of the shaft, i.e. the greater the curvature, the broader the figure of revolution, and vice versa.

In one form of the invention, a shaft whose curvature is to be measured is so disposed with respect to a light source and a bank of photosensitive elements that the shaft casts a shadow across the bank of elements. With the shaft perfectly straight, rotation thereof causes the figure of revolution to be essentially a straight line, and hence the aforesaid shadow is invariant. When the shaft is not perfectly straight, however, its rotation causes the shadow to vary in size and shape, whereby a number of photosensitive elements are successively shadowed depending on the configuration of the shadow. By sensing the number of photosensitive elements that successively fall in the shadow of the shaft during a given rotation thereof, the shaft degree of curvature may be qualitatively determined.

To be noted from the above is the fact that with this form of the invention only the "number" of successively shadowed photosensitive elements is of concern for determining the straightness of the shaft, i.e. the photosensitive elements are not themselves individually representative of different degrees of shaft curvature. Hence, no assurance need ever be had here that the shaft is specially aligned with one particular photosensitive element prior to its rotation, and accordingly the shaft may be inexactly situated almost anywhere with respect to the bank of photosensitive elements, just so long as its shadow falls somewhere across the bank. As a corollary to this, it is obvious that "shaft diameter" here has no bearing on the indication of straightness, and therefore recalibration for shafts of different diameters is never a requirement of the instant apparatus.

Digital computing techniques have been adopted not only for counting the number of photosensitive elements shadowed during a given rotation of the shaft, but also for determining the length of time during which such counting is to occur. Preferably, counting occurs during a discrete multiple of 180 degrees of shaft rotation, although a fairly accurate curvature-representative count may be had during any arbitrary portion of a shaft rotation.

In teaching the invention, a generalized embodiment thereof is first described, followed by a detailed description of a presently preferred form, as might be employed for example in the manufacture of keyed shafts.

A principal object of the invention is to provide apparatus for use in grading shafts and the like in accordance with their degree of straightness.

Another object of the invention is to provide apparatus for use in determining the extent of straightness had by shafts and the like.

Another object of the invention is to provide apparatus that grades the straightness of a shaft (or the like) by measuring the breadth of its figure of revolution.

Another object of the invention is to provide an electro-optical system that measures the straightness of a shaft (or the like) by rotating the shaft about its longitudinal axis and successively shadowing a bank of photocells by means of the shaft, whereby the number of photocells which get shadowed by the shaft during rotation thereof is indicative of shaft straightness.

Another object of the invention is to provide an electro-optical device that provides a quantity representative of the straightness of a shaft (or the like) by rotating the shaft about its axis and so illuminating a bank of photocells that the shaft, if bent or curved, successively shadows one or more of the photocells, whereby the number of photocells shadowed by the shaft during a given rotation thereof is indicative of the straightness of the shaft.

Figure 2:
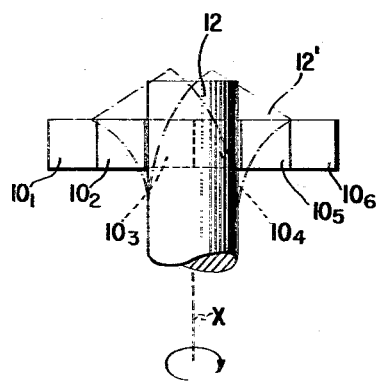
Figure 3:
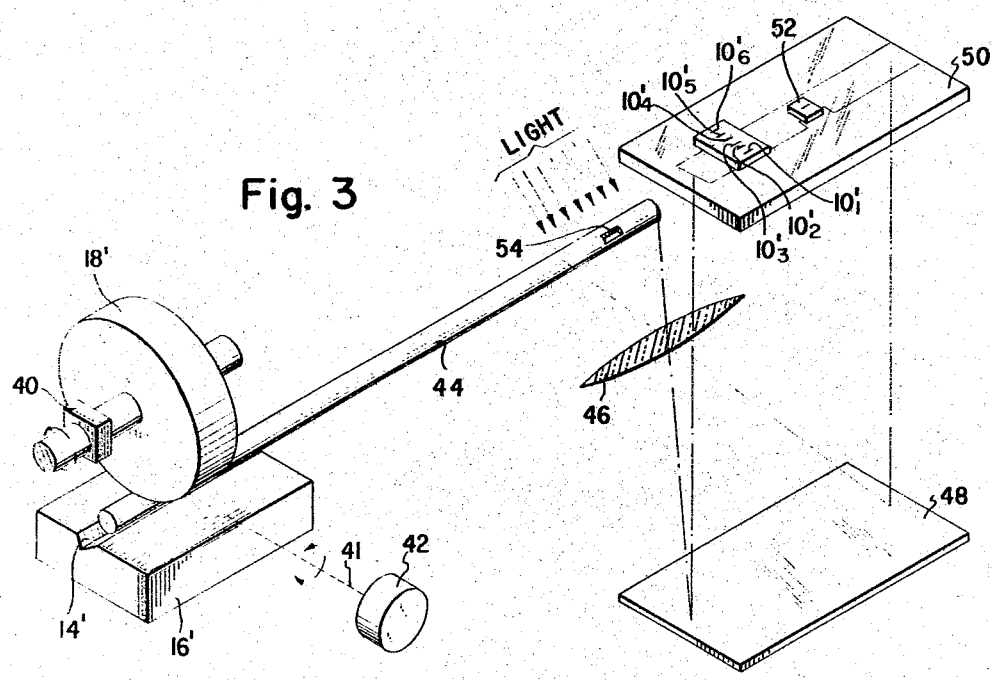
Figure 4:
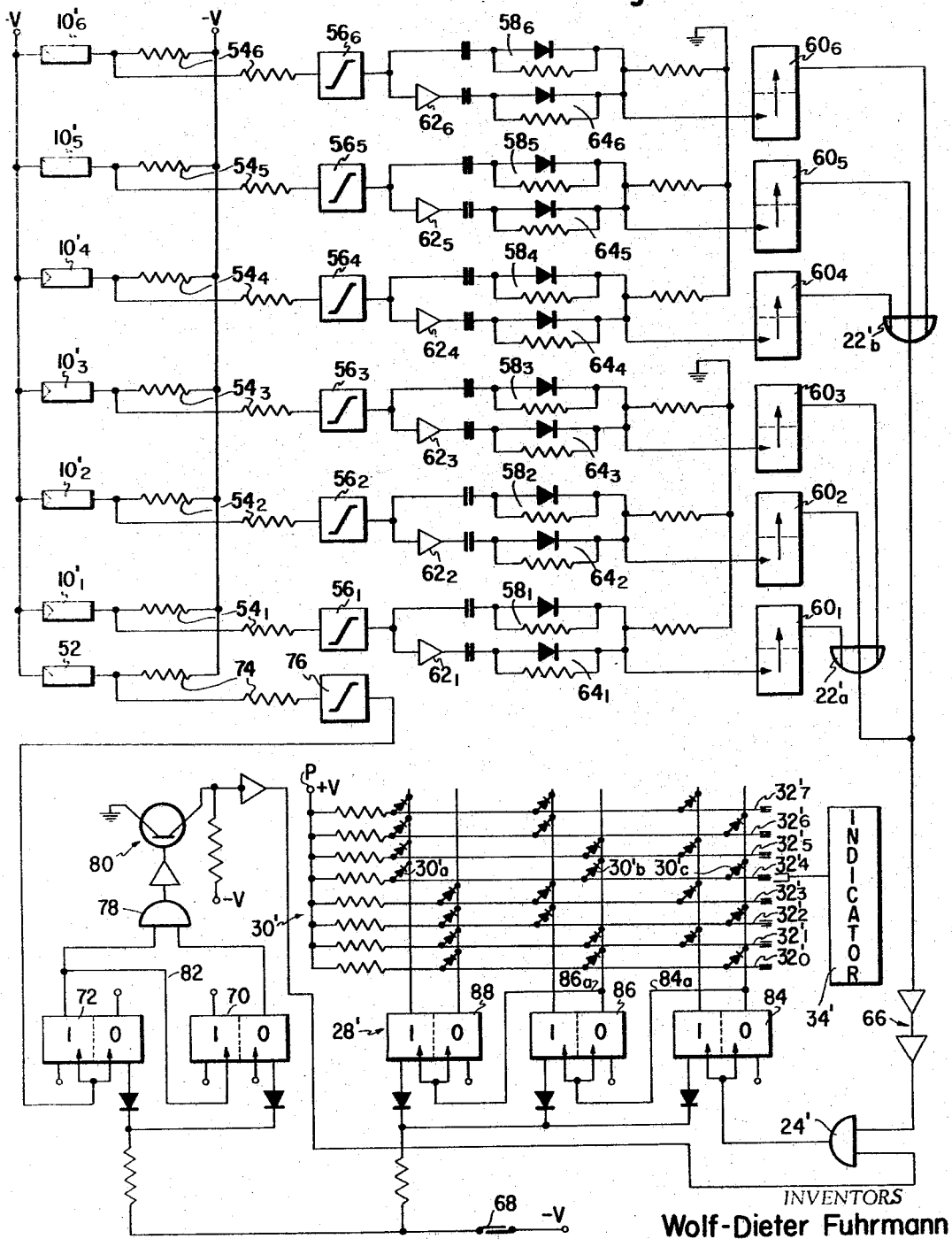

The invention will be described with reference to the figures wherein:

FIG. 1 is a schematic diagram, partially in block form, of one embodiment of the invention,
FIG. 2 is a diagram useful to explain the concept of the invention,
FIG. 3 is a diagram depicting the optics of a presently preferred form of the invention,
FIG. 4 is a schematic diagram of the computing circuit of the present preferred form of the invention, and
FIGS. 5 and 6 are diagrams useful in describing the operation of the apparatus of FIGS. 3 and 4.

Referring to FIG. 1, a bank of six photosensitive elements $10_1$ through $10_6$ are shielded from a source of light by a shaft 12, the straightness of which is to be measured. The shaft 12 is supported for rotation in a V-shaped notch 14 in a support 16, and a drive wheel 18 is adapted to bear against and frictionally rotate the shaft 12 within the notch 14. The photosensitive elements $10_1$ through $10_6$ apply their respective output signals to pulse shaping circuits $20_1$ through $20_6$, which then convert such signals to sharply defined pulses having steep leading and trailing edges. The output pulse signals from the pulse shaping circuits $20_1$ through $20_6$ are applied to an OR circuit 22, the output of which is a serial pulse train that gets applied to the input of an AND circuit 24. Depending on whether a gate opening signal is simultaneously applied from a pulse generator 26 to the AND circuit 24, the serial train of pulses from the OR circuit 22 is passed through the AND circuit 24 to a binary counter 28. The pulse generator 26 produces a signal having a square waveform with a duration representative of a given amount of shaft rotation, e.g. 180 degrees. The output count of the counter 28 is decoded in a binary-to-decimal decoder 30, whereby depending on the straightness of the shaft 12, one (and only one) of the decoder output lines $32_0$ through $32_7$ get excited. For very straight shafts, the line $32_0$ is excited; for very curved shafts, the line $32_7$ is excited, etc. A grading device 34 for indicating the measured straightness of the shaft 12, i.e. for indicating which one of the lines $32_0$ through $32_7$ is excited, or for telling whether shaft straightness is more or less than a certain amount, may take any of a variety of well-known forms: For example, respective indicating lamps or relay circuits may connect to the lines $32_0$ through $32_7$; or an alarm device may connect to receive only the signal for example on one decoder output line, e.g. the line $32_3$.

To assure that the counter 28 always counts from zero at the start of a measuring cycle, i.e. at the instant the AND gate 24 first opens in response to the leading edge of the square wave signal from the pulse generator 26, the counter 28 in this form of the invention may be cleared after each measuring cycle by a pulse output signal derived from a pulse generator circuit 26.

Referring now to FIG. 2, the shaft 12 is arbitrarily shown shadowing two photosensitive elements $10_3$ and $10_4$. (As may readily be appreciated, resolving between degrees of shaft straightness is dependent on the spacing between, and the dimensions of, the photosensitive elements 10; hence, such parameters may be selected to suit the need. Also, it is obvious that while only six photosensitive elements are shown, the number of such elements may be varied as required.) With the shaft 12 perfectly straight, rotation thereof about its axis $x$ will never cause any but the photosensitive elements $10_3$ and $10_4$ to be shadowed. As a result, no pulses here will pass through the gates 22 and 24 to the counter 28, with attendantly the line $32_0$ becoming excited to indicate a perfectly straight shaft. Consider, however, the straightness measurement of a curved shaft 12', such shaft 12' having its axis coincidental with the axis $x$. Here, the initial condition of the shaft 12' is such that prior to its rotation, it shadows three photosensitive elements, viz $10_3$, $10_4$, and $10_5$. On being rotated through 180 degrees, however, the shaft 12' ceases to shadow the photosensitive element $10_5$, and instead shadows the photosensitive element $10_2$, whereby the pulse shaping circuit $20_5$ first produces an output pulse and then the pulse shaping circuit $20_2$ does likewise. These pulses are sequentially applied to the counter 28, and ultimately cause the grading device input line $32_2$ to become excited to indicate a shaft non-straightness of a certain amount. To be appreciated is that since the instant technique depends on changing conditions, in the photosensitive elements, the initial rotational phase of the shaft, or its alignment relative to a given photosensitive element, are of little concern. That is, the pulse count for the shaft 12' of FIG. 2 would be "two," regardless of the starting phase of the shaft, and regardless of the lateral position of its axis $x$.

For a presently preferred form of the invention useful, for example, for measuring the straightness of small elongated members, reference should now be had to FIGS. 3 and 4. In this form of the invention, the shaft 44 does not directly shadow a bank of photosensitive elements, but because of its small size is used instead to create an enlarged shadow of itself. In this way, the problem of having the shaft continuously shadow directly only one photocell, though such shaft is curved of bent, is obviated. In FIG. 3, the shaft rotating wheel 18' is depicted as being supported in a journal bearing 40 that is itself pivotable about an axis 41 by means of a knob 42; this is provided for easy insertion of the shaft 44 into the notch 14' in the support 16'. A source of light illuminates the tip of the shaft 44, and the resultant image (dark shaft on a light background) is magnified by means of a lens system 46, being then directed to a reflecting mirror 48, from whence it projects to a sheet of ground glass 50. Photocells $10_1'$ through $10_6'$ are disposed to be shadowed by the image on the glass 50; in addition, a photocell 52 is disposed to be illuminated by the magnified image of a keying notch 54 that locates at one end of the shaft 44. The notch 54 is employed as will be described below to define the duration during which "counting" occurs.

Referring now in particular to the circuit diagram of FIG. 4, the photocell $10_1'$ through $10_6'$ respond to changing light conditions and apply their output signals, through respective resistance networks $54_1$ through $54_6$, to respective Schmitt trigger circuits $56_1$ through $56_6$. Each Schmitt circuit produces a sharply defined pulse having a polarity depending respectively on whether its respective photocell is in the process of being illuminated or being shadowed by the image of the rotating shaft. Positive pulse signals from the Schmitt circuits $56_1$ through $56_6$ are applied, through respective diode circuits $58_1$ through $58_6$, to respective monostable multivibrators $60_1$ through $60_6$; negative pulses from the Schmitt circuits $56_1$ through $56_6$ are, however, first inverted (to positive pulses), by respective amplifiers $62_1$ through $62_6$, and then applied through diode circuits (respectively $64_1$ through $64_6$) to the monostable multivibrators $60_1$ through $60_6$. Hence, the monostable multivibrators always receive positive input pulses, regardless of the polarities of the signals produced by their respective photocells. This is important to the instant embodiment because shaft examination here is only conducted during 180 degrees of shaft rotation, and depending on the phase of shaft rotation at the start of the examination, either all positive or all negative, or combinations of both positive and negative pulses could be produced by the photocells $10_1'$ through $10_6'$.

The monostable multivibrators $60_1$ through $60_6$ apply their respective output signals through OR gates $22_a'$ and $22_b'$, from whence they are applied through amplifiers 66 to an AND gate 24'. The AND gate 24', in this embodiment, is opened when two conditions exist, viz (1) a shaft is placed in the notch 14' after which time (2) the photocell 52 that cooperates with the shaft notch senses a "dark-to-light" changing light condition. The next "dark-to-light" changing light condition sensed by the photocell 52 closes the gate 24' as will be described below. Placing a shaft in the notch 14' has the effect of closing (and then opening) a switch 68, whereby a pair of flip-flop circuits 70 and 72 are driven to their respective ZERO states. As the shaft 44 is rotated, its notch 54 illuminates the photocell 52 to cause a positive signal to be applied through a resistance network 74 to a Schmitt trigger circuit 76. The trigger circuit then applies a pulse to the flip-flop 72 to drive that circuit to its ONE state, whereby an AND gate 78 is activated to drive a square wave pulse generator circuit 80 (i.e. a switching circuit) to produce the leading edge of a square wave signal that opens the AND gate 24. As the shaft 44 continues to rotate, its notch 54 (180 degrees of rotation later) again senses a changing "dark-to-light" condition, causing a pulse again to be applied from the Schmitt circuit 76 to the flip-flop 72. This results in the flip-flop 72 being switched to its ZERO state, and in so doing causes a signal (via a lead 82) to be applied to the flip-flop 70, whereby flip-flop switches to its ONE state. Now the AND gate 78 produces no output signal, resulting in the state of the square wave pulse generator 80 being again switched to produce the trailing edge of the aforementioned square wave, whereby the AND gate 24' is closed. In other words, the AND gate 24' is opened for precisely 180 degrees of shaft rotation.

Pulses representative of the nonstraightness of the shaft 44 which pass through the AND gate 24' during the time such gate is opened are applied to a binary counter 28' consisting of three flip-flops, viz 84, 86, 88. To be noted is that the counter flip-flops also are set to ZERO via the switch 68 each time a shaft is inserted into the notch 14', this being necessary to prevent any residual information in the counter 28' from causing a count that is erroneously representative of shaft straightness. The binary count held by the counter 28' is converted to a decimal representation thereof by means of a diode decoding matrix 30', whereby one of the decoder output lines $32_0'$ through $32_7'$ gets excited depending on the count in the counter 28'. An indicating device 34', which may be connected to any one of the decoder output lines, alarms only when the non-straightness representative count reaches a certain predetermined amount, in this case, decimal 4.

To appreciate the operation of the apparatus of FIGS. 3 and 4, consider that a shaft as shown in FIG. 5 is inserted into the notch 14' with the arbitrarily selected phase of minus 90 degrees. Instantly, all flip-flops 70, 72, 84, 86, and 88 are driven to their ZERO states by the switch 68. As the shaft rotates from minus 90 degrees to 0 degrees, the photocells $10_2'$ and $10_3'$ cause pulses to be produced, but since the flip-flop 72 is not in its ONE state, no gate opening square wave is applied to the AND gate 24', the result here being that neither of the photocell ($\overline{10_2'}$ and $10_3'$) pulses gets applied to the counter 28'. At 0 degrees, the shaft notch 54 appears, causing the photocell 52 to produce and apply a pulse to the flip-flop 72 to drive such flip-flop to its ONE state. This causes the circuit 80 to apply a gate opening signal to the AND gate 24′. As the shaft rotates from 0 degrees to 90 degrees, the photocells $10_4'$ and $10_5'$ are, in turn, shadowed; as the shaft rotates from 90 degrees to 180 degrees, the photocells $10_5'$ and $10_4'$ are, in turn, illuminated. Therefore, during its rotation from 0 degrees to 180 degrees, four pulses are applied to and pass through the AND gate 24′. At 180 degrees of shaft rotation, the notch 54 again appears, causing a pulse to be applied to the flip-flop 72 which, in response thereto, causes the gate opening signal from the circuit 80 to be removed from the AND circuit 24′.

The four pulses which pass through the AND circuit 24′ during the portion of shaft rotation (see FIG. 6) from $\phi = 0°$ to $\phi = 180°$ operate on the counter as follows: pulse #1 drives the flip-flop 84 to its ONE state; pulse #2 drives the flip-flops 84 to its ZERO state, and in so switching, the flip-flop 84 applies a pulse (via a lead $84_a$) to the flip-flop 86, driving the flip-flop 86 to its ONE state; pulse #3 again sets the flip-flop 84 to its ONE state causing the flip-flops 84 and 86 both to store ONE's; finally pulse #4 drives the flip-flop 84 to its ZERO state, and in so doing, the flip-flop 84 via the lead $84_a$ drives the flip-flop 86 to its ZERO state; in switching to its ZERO state, the flip-flop 86 applies a pulse (via a lead $86_a$) to the flip-flop 88, causing the flip-flop 88 to store a ONE. Hence the binary count in the counter 28′ is 100. Decoding of the count 100 to excite the lead $32_4$ is had by respectively biasing diodes $30_a'$, $30_b'$ and $30_c'$ by means of the ONE state of the flip-flop 88, and the ZERO states of the flip-flops 84 and 86, whereby signal processing from a source point P is only possible via the lead $32_4$.

Many variations of the above apparatus are possible: Respective indicators may connect to the decoder output lines $32_0'$ through $32_7'$ to indicate the precise grading of the shaft, the straightness of which is being measured; counting could be carried on durin, for example, 360 degrees of shaft rotation (i.e. the gate 24′ could be arranged to be held open for 360 degrees of shaft rotation); means could be employed to receive the signal for example on line $32_4'$ to route the shaft to either one of two processing stations; or similarly, respective means could be employed with the output lines $32_0'$ to $32_7'$ to route the shaft to any one of eight processing stations, wherefrom, if desired, complete statistical quality control information may be had. Also, while the invention is taught re the measuring of shaft straightness for straight elements, it may just as easily be employed to measure for example the curvature of curved members and the like, etc.

Within the scope of the invention is the idea of making straightness measurements by defining the boundaries of a shaft figure of revolution by means for example of a pair of spaced apart sensors, whereby when either sensor produces a signal, "straightness" is considered to have exceeded certain limits. This technique is however (usually) an unpreferred substitute for the above described "counting" technique, since here not only must the axis of the figure of revolution fall precisely between the two sensors prior to the measuring period, but also because measurements are undesirably directly dependent on shaft diameter. That is, the figure of revolution of very thin but curved shafts may be such that the sensors never produce signals; and thick shafts may cause the sensors to produce signals even though such shafts are perfectly straight.

While the invention has been described in its preferred embodiments, it is to be understood that the words which have been used are words of description rather than of limitation and that changes within the purview of the appended claims may be made without departing from the true scope and spirit of the invention in its broadest aspects.

What is claimed is:

1. Apparatus for use in grading elongated elements according to straightness comprising a support adapted to hold an element substantially translationally stationary, means for rotating said element about an axis substantially parallel to the longitudinal axis of said element, a source of radiant energy directed at and perpendicular to the longitudinal axis of said element, sensor means responsive to said radiant energy and disposed to be shadowable from said radiant energy when the figure of revolution of said element exceeds a predetermined amount, and actuable means responsive to the output of said sensor means, whereby grading is determined by whether said actuable means is actuated.

2. The apparatus of claim 1 wherein said radiant energy is light, and wherein said sensor means is photoelectric means.

3. Apparatus for use in grading elongated elements according to straightness comprising a support adapted to hold an element substantially translationally stationary, means for rotating said element about an axis substantially parallel to the longitudinal axis of said element, a source of radiant energy directed at and perpendicular to the longitudinal axis of said element, plural sensors responsive to said radiant energy and so disposed in a row that at least some thereof may be sequentially shadowed from said energy as said element is rotated, and means for counting the number of sensors that are shadowed from said energy during a predetermined rotation of said element, whereby said count is representative of the straightness of the element.

4. The apparatus of claim 3 wherein said radiant energy is light, and wherein said sensors are photoelectric cells.

5. Apparatus for use in grading the straightness of a small elongated element comprising means for supporting said element substantially at one of its ends and for rotating said element about an axis substantially parallel to the longitudinal axis of the element, means for casting light on the other end of said element and for directing said light perpendicular to the longitudinal axis of the said element, means for magnifying the shadow image of said element, a row of photocells adapted to fall in the magnified shadow of said element for producing a train of signals as said element is rotated, and means for counting the number of signals produced during a predetermined rotation of said element.

6. Apparatus for use in grading the straightness of a small elongated element comprising means for supporting said element substantially at one of its ends for rotation about an axis substantially parallel to the longitudinal axis of the element, means for casting light on the other end of said element and for directing same substantially perpendicular to the longitudinal axis of the element, means for magnifying the shadow image of said element, a row of photocells adapted to fall sequentially in the magnified shadow of the said element as said element is rotated, said photocells producing signals as they are respectively shadowed and illuminated, and means for counting the number of signals produced during a half cycle of element rotation, whereby said count is representative of the straightness of said element.

7. Apparatus for use in grading the straightness of a small elongated element comprising means for supporting said element substantially at one of its ends for rotation about an axis substantially parallel to the longitudinal axis of the element, means for casting light on the other end of said element and for directing said light perpendicular to the longitudinal axis of the element, means for magnifying the shadow image of said element, a row of photocells adapted to fall sequentially in the magnified shadow of said element as said element is rotated, said photocells producing signals as they are respectively shadowed and illuminated, AND gate means adapted to receive said photocell signals, means for producing and applying a gate opening signal to said AND gate means, the duration of said gate opening signal being substantially representative of a half cycle of element rotation, and binary counting means adapted to receive the output of said AND gate means to count the number of pulses occuring during application of said gate opening signal to said gate means, whereby the binary count in said counting means is representative of the straightness of said element.

8. The apparatus of claim 7 including means for decoding the binary count in said binary counting means for selectively exciting respective output lines thereof according to said count, and means coupled to said decoding means and actuable thereby when said decoded count is of a predetermined certain level.

9. Digital computing apparatus for determining the straightness of an elongated element such as a shaft comprising a bank of photocells, respective pulse forming circuits responsive to the output signals of said photocells, OR circuit means for receiving the pulses produced by said pulse forming circuits, an AND circuit for receiving the output pulses from a said OR circuit means, means for producing a gate opening pulse having a predetermined duration, said gate opening pulse being applied to said AND circuit, means for counting the pulse output of said AND circuit, actuable means responsive to the count of said counting means, means for supporting said elongated element so that said element creates a shadow across at least one of said photocells, and means for rotating said elongated element substantially about an axis parallel to the longitudinal axis of the element, whereby the number of photocells successively shadowed by means of the element is representative of the straightness of the element.

10. The apparatus of claim 9 wherein each of said photocells, and its respective pulse forming circuit, produces a pulse whether the concerned photocell is being shadowed or illuminated, and wherein the predetermined duration of the gate opening pulse is representative of 180 degrees of rotation of the elongated element.

11. Digital computing apparatus for determining the straightness of an elongated element such as a shaft comprising a bank of photocells, respective pulse forming circuits responsive to the output signals of said photocells, OR circuit means for receiving the pulses produced by said pulse forming circuits, an AND circuit for receiving the output pulses from a said OR circuit means, means for producing a gate opening pulse having a predetermined duration, said gate opening pulse being applied to said AND circuit, a binary counter for counting the pulse output of said AND circuit, means for decoding the count in said counter and having plural output lines selectively excitable according to said binary count, means connectable to any one of said decoder output lines and actuable in response to excitation of that line, means for supporting said elongated element so that said element creates a shadow across at least one of said photocells, and means for rotating said elongated element substantially about an axis parallel to the longitudinal axis of the element, whereby the number of photocells successively shadowed during said duration by means of the rotating element is representative of the straightness of the element.

12. The apparatus of claim 11 wherein each of said photocells, and its respective pulse forming circuit, produces a pulse whether the concerned photocell is being shadowed or illuminated, and wherein the predetermined duration of the gate opening pulse is representative of 180 degrees of rotation of the elongated element.

13. The apparatus of claim 11 including means for resetting the count of said counter to zero, and for disabling said means for producing square wave pulses, prior to each determination of element straightness.

14. Digital computing apparatus for determining the scope of the figure of revolution of an elongated shaft, wherefrom a determination of the straightness of the shaft may be had, comprising a bank of photocells arranged substantially in a row, means receiving signals from said photocells for producing pulses in response thereto, an AND gate, means for applying said pulses to said AND gate, means for supporting said shaft and for rotating same about an axis substantially parallel to the longitudinal axis of said shaft, means for illuminating said shaft and for casting the shadow thereof across at least one of said photocells, means cooperating with said means for rotating said shaft for applying a signal to said AND gate, said signal having a duration representative of a given rotation of said shaft, and means for counting the pulses applied through said AND gate for a determination of the shaft figure of rotation.

15. The apparatus of claim 14 wherein said given rotation is 180 degrees, and wherein said pulse photocells means produce pulses whether their respective photocells are being shadowed or illuminated.

16. The apparatus of claim 15 wherein said means for supporting said shaft supports same at one end, wherein said shaft is illuminated at its other end, and wherein said means for casting a shadow includes optical means for magnifying said shadow.

References Cited by the Examiner
UNITED STATES PATENTS

| | | | |
|---|---|---|---|
| 2,415,175 | 2/1947 | Hurley | 88—14 |
| 2,714,328 | 8/1955 | Hamburger et al. | 33—174 |
| 3,066,226 | 11/1962 | Lindstrom | 250—222 |

RALPH G. NILSON, *Primary Examiner.*

M. ABRAMSON, *Assistant Examiner.*